(12) United States Patent
Chatterjee et al.

(10) Patent No.: US 10,469,559 B2
(45) Date of Patent: Nov. 5, 2019

(54) QUALITY OF SERVICE FOR WEB REAL-TIME COMMUNICATION NETWORKS

(71) Applicant: Avaya Inc., Santa Clara, CA (US)

(72) Inventors: Manish Chatterjee, Calcutta (IN); Biswajyoti Pal, Navi Mumbai (IN)

(73) Assignee: Avaya Inc., Santa Clara, CA (US)

( * ) Notice: Subject to any disclaimer, the term of this patent is extended or adjusted under 35 U.S.C. 154(b) by 423 days.

(21) Appl. No.: 14/958,727

(22) Filed: Dec. 3, 2015

(65) Prior Publication Data

US 2017/0163422 A1   Jun. 8, 2017

(51) Int. Cl.
| | |
|---|---|
| *H04L 29/06* | (2006.01) |
| *H04L 29/08* | (2006.01) |
| *H04L 12/24* | (2006.01) |
| *H04L 9/32* | (2006.01) |

(52) U.S. Cl.
CPC ............ *H04L 67/02* (2013.01); *H04L 9/3226* (2013.01); *H04L 41/5019* (2013.01); *H04L 65/608* (2013.01); *H04L 65/80* (2013.01); *H04L 41/509* (2013.01); *H04L 2209/76* (2013.01)

(58) Field of Classification Search
None
See application file for complete search history.

(56) References Cited

U.S. PATENT DOCUMENTS

| | | | | |
|---|---|---|---|---|
| 9,497,226 B2* | 11/2016 | Benner | ............... | H04L 65/1006 |
| 9,807,059 B2* | 10/2017 | Stahl | ................... | H04L 12/1403 |
| 10,225,212 B2* | 3/2019 | Waxman | ............... | H04L 49/206 |
| 2010/0250710 A1* | 9/2010 | Cadwell | ............... | H04L 67/1008 709/219 |
| 2013/0142201 A1* | 6/2013 | Kim | ..................... | H04L 12/4645 370/392 |
| 2014/0126708 A1* | 5/2014 | Sayko | .................... | H04M 11/00 379/93.01 |
| 2014/0282903 A1* | 9/2014 | Singh | ..................... | H04L 63/08 726/4 |
| 2014/0324979 A1* | 10/2014 | Gao | ........................ | G06F 17/00 709/204 |
| 2015/0026473 A1* | 1/2015 | Johnston | ............... | H04L 63/126 713/171 |
| 2015/0082021 A1* | 3/2015 | Mandyam | ............... | G06F 9/541 713/151 |

(Continued)

*Primary Examiner* — Michael R Vaughan
(74) *Attorney, Agent, or Firm* — Sheridan Ross P.C.

(57) ABSTRACT

A request to establish an encrypted media stream is received, by an edge server, for a Web Real-Time Communication (WebRTC) communication session between a first browser, and a second browser or gateway. The edge server is a boundary device between a first network and a second network. The edge server retrieves a tenant identifier for the encrypted media stream. The tenant identifier can identify a specific company or enterprise. In response to receiving the tenant identifier for the encrypted media stream for the WebRTC communication session, a list of one or more Quality-of-Service (QoS) parameters associated with the tenant is retrieved. For example, the list of QoS parameters may be based on a Service Level Agreement (SLA). The edge server dynamically sends a message to configure the second network to support the list of one or more QoS parameters associated with the tenant.

20 Claims, 6 Drawing Sheets

(56) References Cited

U.S. PATENT DOCUMENTS

| | | | |
|---|---|---|---|
| 2015/0127709 A1* | 5/2015 | Pai | H04L 65/1006 709/202 |
| 2015/0195178 A1* | 7/2015 | Bhattacharya | H04L 45/745 718/1 |
| 2015/0341312 A1 | 11/2015 | Ezell et al. | |
| 2017/0034224 A1* | 2/2017 | Baram | H04L 65/1069 |

* cited by examiner

QUALITY OF SERVICE FOR WEB REAL-TIME COMMUNICATION NETWORKS

TECHNICAL FIELD

The systems and methods disclosed herein relate to communication systems and in particular to Web Real-Time Communication (WebRTC) communication systems.

BACKGROUND

WebRTC is designed to prevent man-in-the-middle attacks by providing end-to-end encryption of communication sessions between browsers. However, this end-to-end encryption prevents intermediate entities to enforce Quality of Service (QoS) across network elements for the WebRTC communications coming into an enterprise or contact center. For example, a type of priority level cannot be defined for the network elements because the end-to-end encryption is directly sent between the browsers.

BRIEF SUMMARY

Systems and methods are provided that can enforce QoS across network elements for WebRTC communications.

A request to establish an encrypted media stream can be received, by an edge server, for a Web Real-Time Communication (WebRTC) communication session between a first browser, and a second browser or gateway. The edge server is a boundary device between a first network and a second network. The edge server retrieves a tenant identifier for the encrypted media stream. The tenant identifier can identify a specific company or enterprise.

In response to receiving the tenant identifier for the encrypted media stream for the WebRTC communication session, a list of one or more Quality-of-Service (QoS) parameters associated with the tenant is retrieved. For example, the list of QoS parameters may be based on a Service Level Agreement (SLA). The edge server dynamically sends a message to configure the second network to support the list of one or more QoS parameters associated with the tenant. For example, the edge server dynamically sends the message to a Software Defined Network (SDN) controller that dynamically configures network elements, such as routers, to provide the necessary QoS.

DETAILED DESCRIPTION

Figure 1:
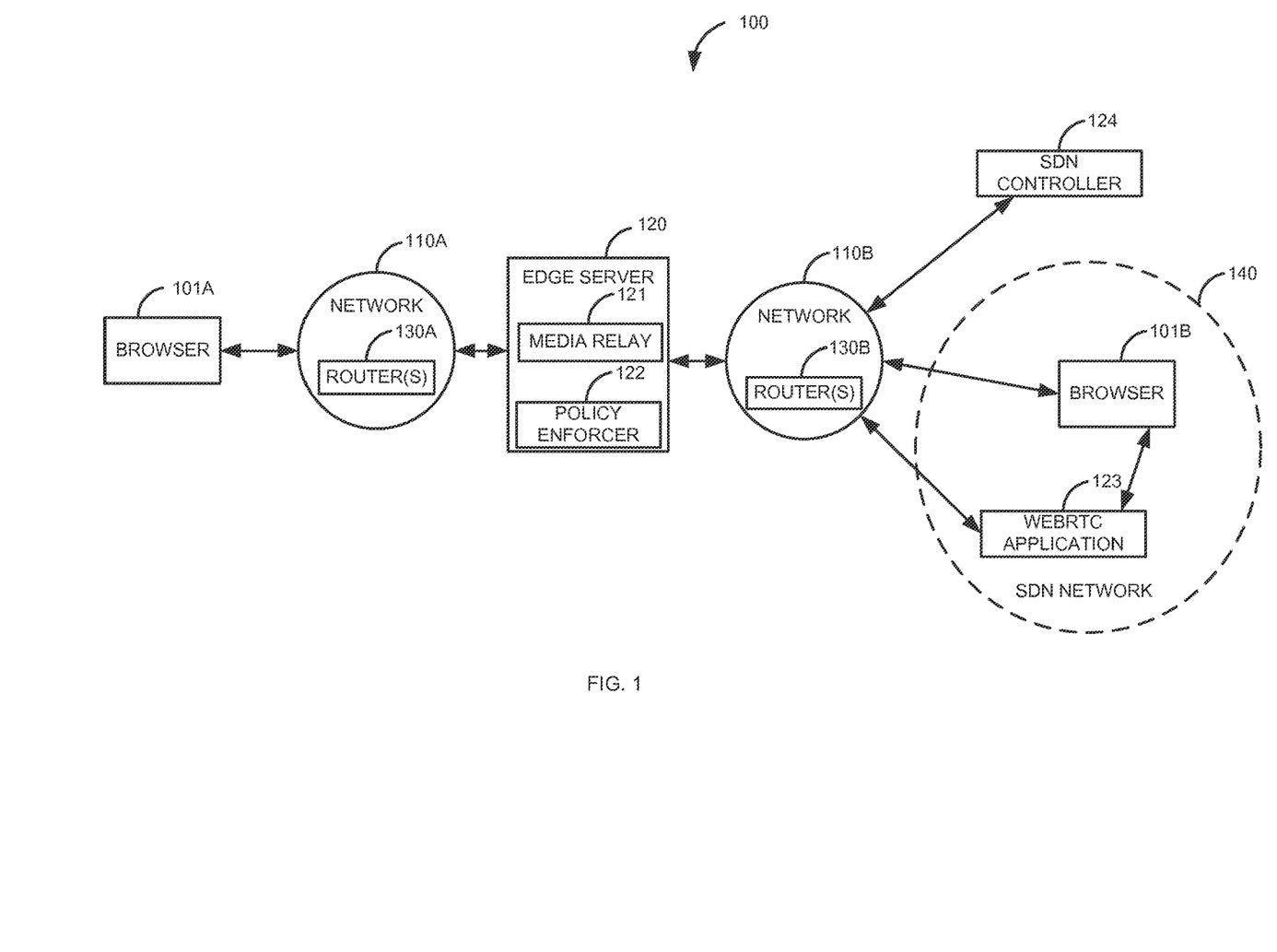
FIG. 1 is a block diagram of a first illustrative system for providing QoS for WebRTC communications.

FIG. 1 is a block diagram of a first illustrative system 100 for providing QoS for WebRTC communications. The first illustrative system 100 comprises browsers 101A-101B, networks 110A-110B, an edge server 120, a WebRTC application 123, a Software Defined Network (SDN) controller 124, and a Software Defined Network (SDN) 140.

The browser 101 can be or may include any browser 101 that can be loaded on a communication device, such as Internet Explorer™, Google Chrome™, Safari™, Firefox™, Safari™, Opera™, and/or the like. The browser 101 can run on a variety of communication devices, such as a Personal Computer (PC), a video system, a cellular telephone, a Personal Digital Assistant (PDA), a tablet device, a notebook device, a smart phone, and the like. While FIG. 1 only shows two browsers 101A-101B, any number of browsers 101 may be in each of the networks 110A-110B.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, Internet Protocol (IP), Session Initiation Protocol (SIP), Integrated Services Digital Network (ISDN), WebRTC, Real-Time Protocol (RTP), Real-Time Control Protocol (RTCP), and/or the like. Thus, the networks 110A-110B are electronic communication networks configured to carry messages via packets and/or circuit switched communications.

The network 110A is typically a public network, such as the Internet, the Public Switched Telephone Network (PSTN), and/or the like. The network 110B is typically a private network, such as a corporate or enterprise network. However, the networks 110A-110B may be two private networks or two public networks.

The networks 110A-110B also comprises one or more routers 130A-130B. The routers 130A-130B are used to route packets across the networks 110A-110B.

The edge server 120 is a hardware device with a processor that executes software. The edge server 120 provides a boundary between the network 110A and the network 110B. Although not shown, the edge server 120 typically provides services, such as a firewall, a Network Address Translator (NAT), a Representational State Transfer (REST) server, a reverse proxy, and/or the like. The edge server 120 also comprises a media relay 121 and a policy enforcer 122.

The media relay 121 is used to relay media in a WebRTC media stream. The media stream can be for a voice communication, a video communication, a data communication, and/or the like. The media relay 121, in conjunction with the WebRTC application 123 typically uses RTP or RTCP for a WebRTC communication. The media relay 121 is a bridge for a media stream sent between the browser 101A and the browser 101B (or possibly a gateway).

The WebRTC application 123 is a web server application 123 that is used in establishing a WebRTC communication session between the browser 101A and the browser 101B. For example, the WebRTC application 123 is used to exchange Datagram Transport Layer Security (DTLS) fingerprints between the browser 101A and the browser 101B so that an encrypted media stream between the browser 101A, the media relay 121, and the browser 101B can be established. During the establishment of the communication session between the browser 101A and the browser 101B, the WebRTC application 123 receives QoS information and a tenant identifier (if there is one) for the communication session via an out-of-band link between the edge server 120 and the WebRTC application 123. For example, a specific type of codec may be identified for a voice communication (used by the media relay 121). Establishment of the media stream can be accomplished as described in U.S. patent application Ser. No. 14/282,974 filed Jun. 9, 2014 entitled "FIREWALL TRAVERSAL FOR WEB REAL-TIME COMMUNICATIONS," which is incorporated herein in its entirety by reference.

The Software Defined Network (SDN) controller 124 can be or may include any hardware coupled with software that can control various elements in the network 110B, such as the router(s) 130, a gateway, a media server, a communication device, and/or (e.g., a network resource) the like. The SDN 140 is a network that is defined where the higher level functionality is abstracted from the underlying systems. In this case, the underlying systems that are used to provide QoS (e.g., such as the router(s) 130B). The SDN 140 comprises the browser 101B and the WebRTC application 123.

Figure 2:
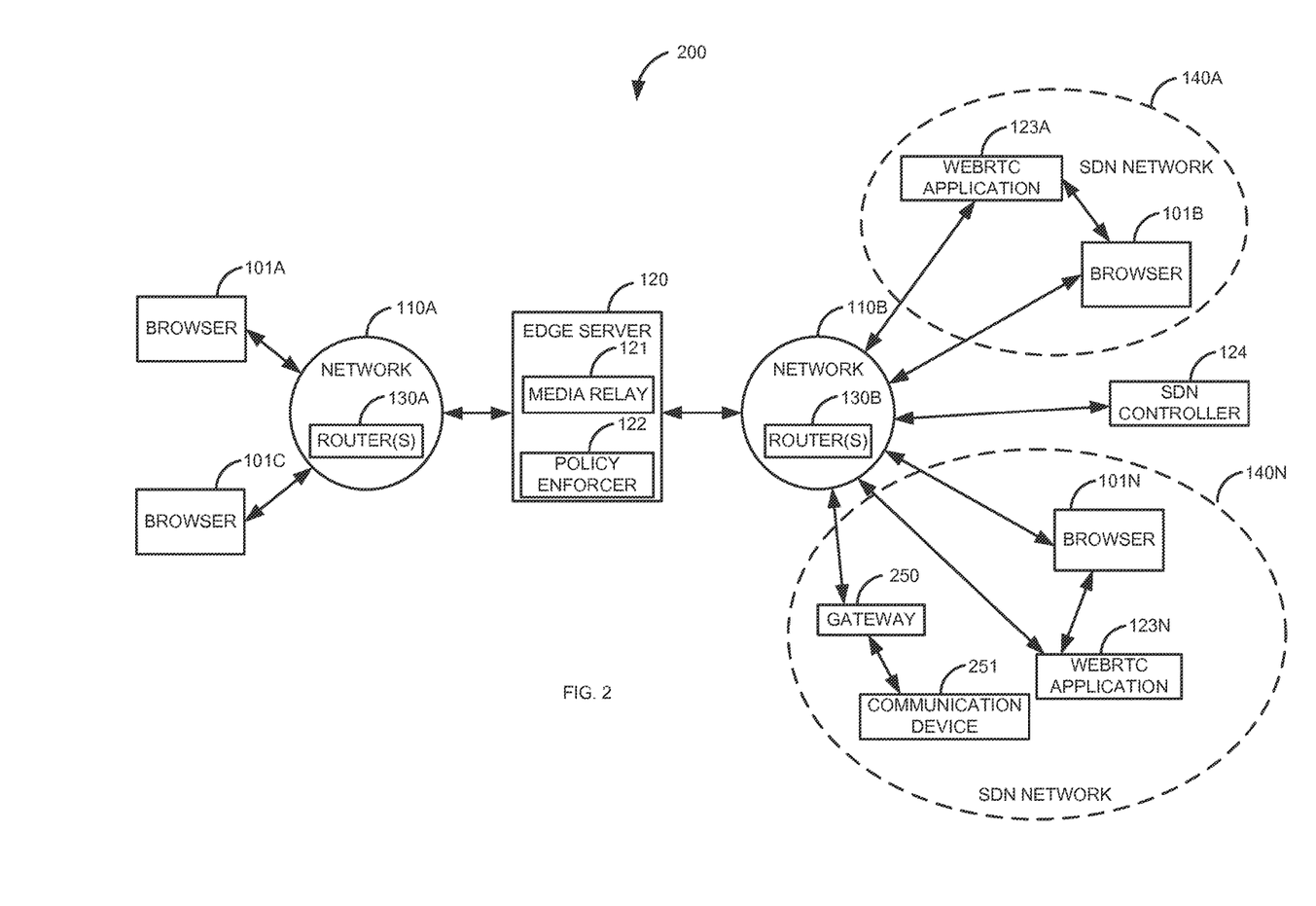
FIG. 2 is a block diagram of a second illustrative system for providing QoS for WebRTC communications for a plurality of Software Defined Networks (SDNs).

FIG. 2 is a block diagram of a second illustrative system 200 for providing QoS for WebRTC communications for a plurality of Software Defined Networks (SDNs) 140A-140N. The second illustrative system 200 comprises browsers 101A-101N, the networks 110A-110B, the edge server 120, WebRTC applications 123A-123N, the SDN controller 124, SDNs 140A-140N, a gateway 250, and a communication device 251.

The gateway 250 can be any hardware/software that can provide a gateway between WebRTC and another protocol, such as, Session Initiation Protocol (SIP) or H.323. The communication device 251 can be any device that can be used to communicate with a browser 101 (e.g., via the gateway 250), such as a Personal Computer (PC), a video system, a cellular telephone, a Personal Digital Assistant (PDA), a tablet device, a notebook device, a smart phone, and the like.

Figure 3:
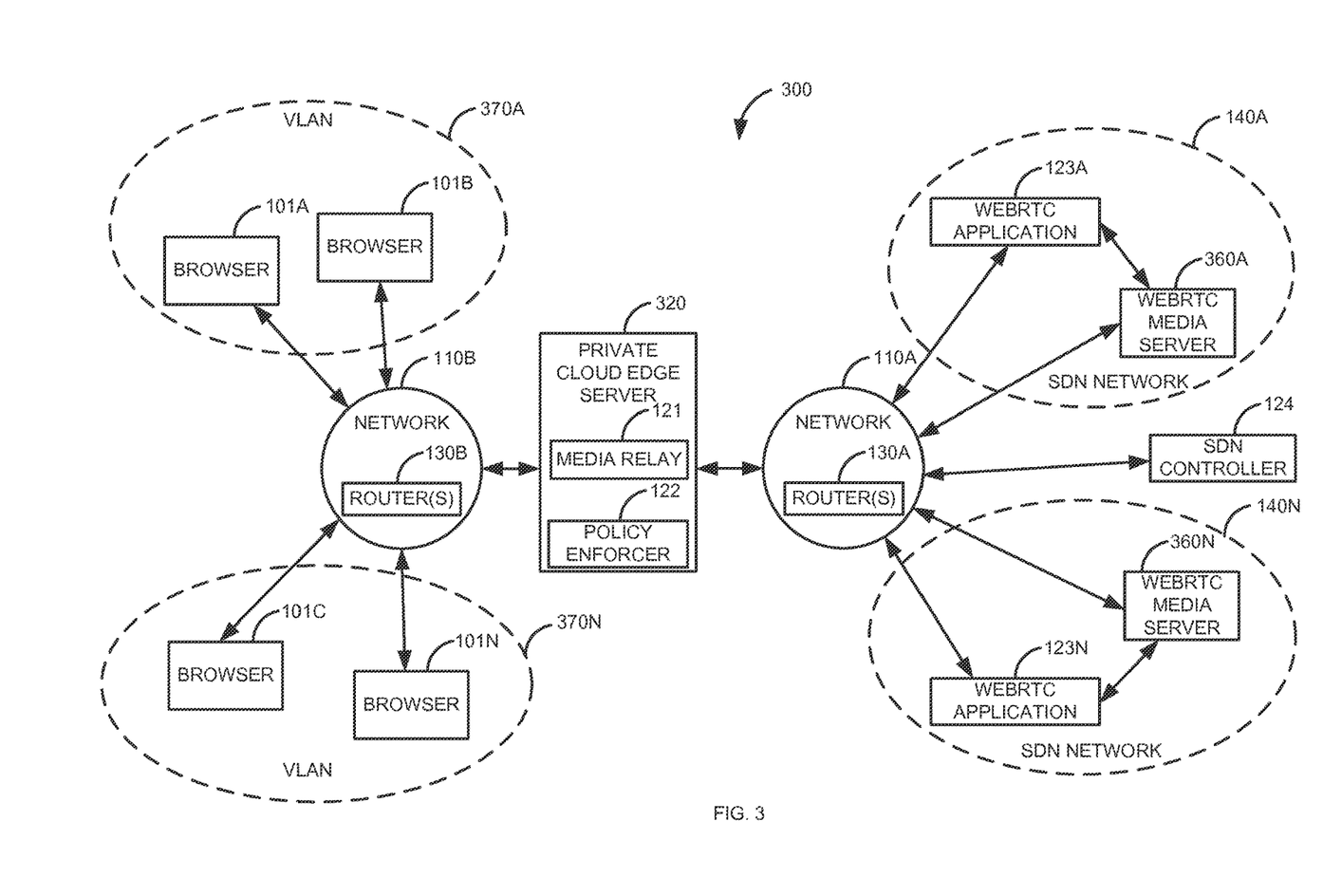
FIG. 3 is a block diagram of a third illustrative system for providing QoS between a Virtual Local Area Network (VLAN) and a plurality of Software Defined Networks (SDNs).

In FIG. 2, the network 110B is partitioned into two SDNs 140A-140N. Although only two SDNs 140A-140N are shown, any number of SDNs may be portioned. The SDN 140A comprises the browser 101B and the WebRTC application 123A. The SDN 140N comprises the browser 101N, the WebRTC application 123N, the gateway 250, and the communication device 251. In FIG. 2, the SDNs 140A-140N are partitioned by the SDN controller 124 into the two separate SDNs 140A-140N. The two separate SDNs 140A-140N may be partitioned based different tenants. For example, two different corporations may use the infrastructure of the network 110B (e.g., routers 130B) as two separate SDNs 140A-140N. By having different SDNs 140A-140N for different tenants, the edge server 120/SDN controller 124 can dynamically configure the infrastructure in the network 110B (e.g., the routers 130A) to provide different levels of QoS for each tenant's SDN 140. The edge server 120/SDN controller 124 can dynamically configure bandwidth usage for different tenants based how much bandwidth is available. For example, the edge server 120/SDN controller 124 can reduce the available bandwidth that one tenant can use based on another tenant that is consuming it allotted amount of bandwidth. FIG. 3 is a block diagram of a third illustrative system 300 for providing QoS between a Virtual Local Area Network (VLAN) and a plurality of Software Defined Networks (SDNs). The third illustrative system 300 comprises browsers 101A-101N, the networks 110A-110B, the WebRTC applications 123A-123N, the SDN controller 124, the SDN networks 140A-140N, a private cloud edge server 320, WebRTC media servers 360A-360N, and Virtual Local Area Networks (VLANs) 370A-370N.

The private cloud edge server 320 is a cloud based edge server 120. The private cloud edge server 320 is a hardware server. The private cloud edge server 120 comprises the media relay 121 and the policy enforcer 122.

The WebRTC media servers 360A-360N can be any hardware server that can stream media, such as a video server, a conference bridge, an audio server, and/or the like. The media servers 360A-360N stream a media stream to the browsers 101A-101N.

The SDN 140A comprises the WebRTC application 123A and the WebRTC media server 360A. The SDN 140N comprises the WebRTC application 123N and the WebRTC media server 360N. The SDN controller 124 is used to partition the SDNs 140A-140N for different tenants. For example, the SDN controller 124 identifies devices, applications, WebRTC media servers 360, associated with different tenants to create the SDNs 140A-140N.

The VLANs 370A-370N are sub-divided networks that are portioned at the data link layer (of the Open Source Interconnect (OSI) model). The VLANs 370A-370N are similar to the SDNs 140A-140N except that the partitioning is done at a lower layer than the SDNs 140A-140N.

The private cloud edge server 320 maintains a mapping of VLAN tags for communication devices 251 (devices running the browsers 101A-101B) in VLAN 370A. The private cloud edge server 320 uses a corresponding identifier defined by the SDN controller 124 to send a communication session to an individual SDN 140. For example, when browser 101A wants to stream a video from the WebRTC media server 360A, the initial WebRTC request will include the VLAN tag for VLAN 370A. The private cloud edge server 320 uses the corresponding SDN identifier provided by the SDN controller 124 to establish the WebRTC communication session between the browser 101A and the WebRTC media server 360A. A similar process is used for the VLAN 370N and the SDN 140N.

In FIG. 3, the parameters, such as QoS parameters, can be enforced in either direction. For example, if a call is made from the SDN 140A (via a browser 101, not shown), the parameters/QoS parameters of the SDN 140A may be enforced in the VLAN 370A. This can be done by sending the QoS parameters to configure network elements in the VLAN. For example, by the private cloud edge server 320 sending a QoS parameter to configure a codec in a communication device 251 with the browser 101A.

Figure 4:
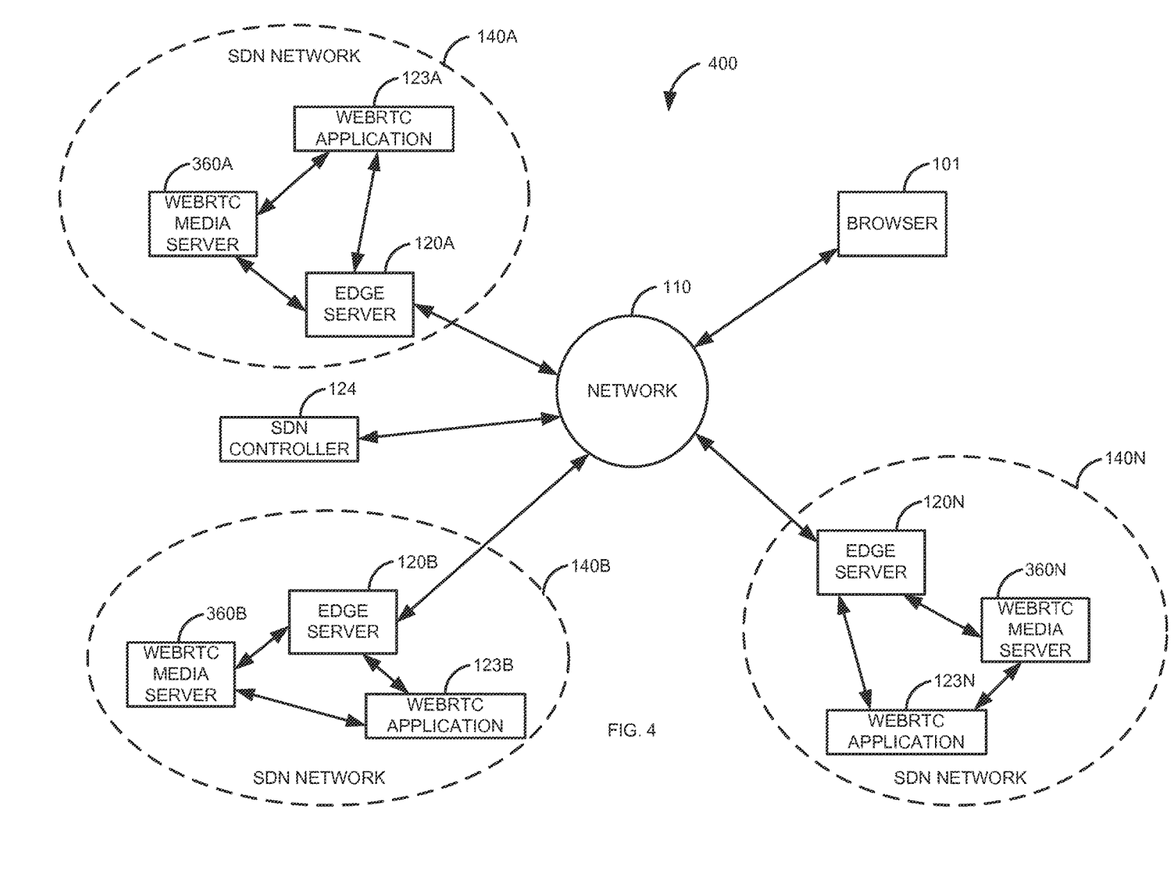
FIG. 4 is a block diagram of a fourth illustrative system for determining an edge server for a WebRTC communication.

FIG. 4 is a block diagram of a fourth illustrative system 400 for determining an edge server 120 for a WebRTC communication. The fourth illustrative system 400 comprises browser 101, network 110, edge servers 120A-120N, WebRTC applications 123A-123N, SDN controller 124, WebRTC media servers 360A-360N, and SDN networks 140A-140N.

The SDN 140A comprises the edge server 120A, the WebRTC application 123A, and the WebRTC media server 360A. The SDN 140B comprises the edge server 120B, the WebRTC application 123B, and the WebRTC media server 360B. The SDN 140N comprises the edge server 120N, the WebRTC application 123N, and the WebRTC media server 360N. The SDNs 140A-140N may be in different physical locations. For example, the SDN 140A may be located in the United States, the SDN 140B may be located in Europe, and the SDN 140N may be located in Asia.

The SDN controller 124 controls requests from the browser 101 to access the WebRTC media servers 360A-360N. In addition, the SDN controller 124 receives QoS information from each of the edge servers 120A-120N. The QoS information can include information, such as, capacity, bit rate, throughput, present traffic, jitter information, supported codecs, and/or the like. The QoS information may be gathered by the edge servers 120A-120N from various network elements, such as the routers 130, the gateway 250, the WebRTC media servers 360, the communication device 251, and/or the like. The SDN controller 124 uses the received QoS information to determine a specific edge server 120 to send the request to. For example, under normal conditions, if the browser 101 makes a request from the United States to access the WebRTC media server 360, the request will be directed to the WebRTC media server 360 that is closest (e.g., in the United States). If the edge server 120 in the United States is heavily loaded (e.g., where taking the request would violate a Service Level Agreement (SLA)), the SDN controller 124 can send the request to a different edge server 120 (and a different WebRTC media server 360) that will be in compliance with the SLA. Different customers may have different SLA agreements that require different QoS. For example, if the United States edge server 120 was heavily loaded, one customer may be redirected to a different edge server 120 while another customer would not be redirected to the different edge server 120 under the same conditions.

Alternatively, the edge servers 120A-120N can send the information to one another. The edge server 120 receives the request to initiate a WebRTC communication session. If the edge server 120 is heavily loaded and cannot support the request, the edge serve 120 can redirect the request to a different edge server 120 that is not as heavily loaded. The redirection can be based on a SLA.

In FIG. 4, each SDN 140A-140N comprises a WebRTC application 123A-123N. However, in some embodiments, there may be only a single WebRTC application 123 used to establish the communication sessions for each of the SDNs 140A-140N.

Figure 5:
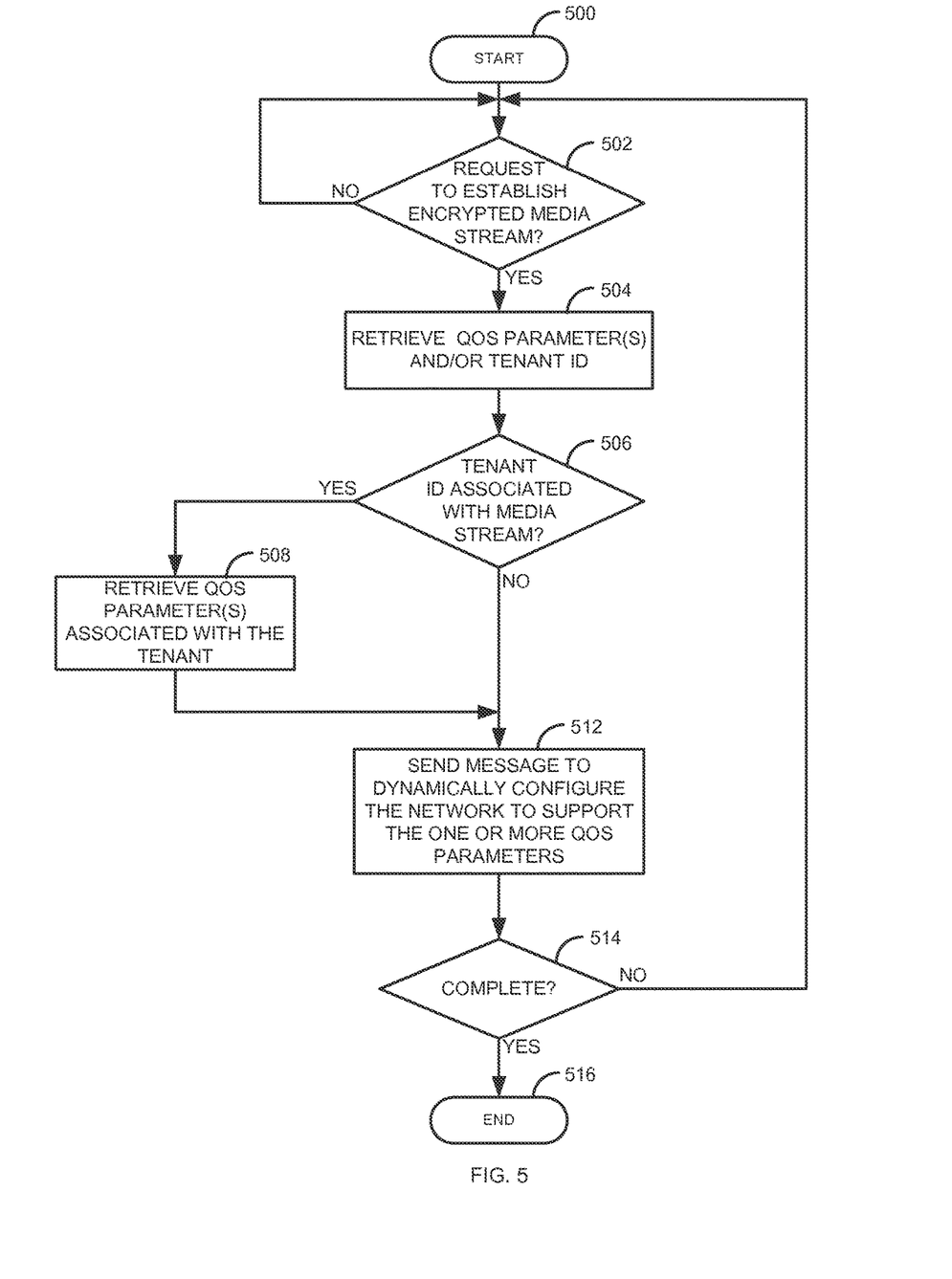
FIG. 5 is a flow diagram of a process for providing QoS for WebRTC communications.
Figure 6:
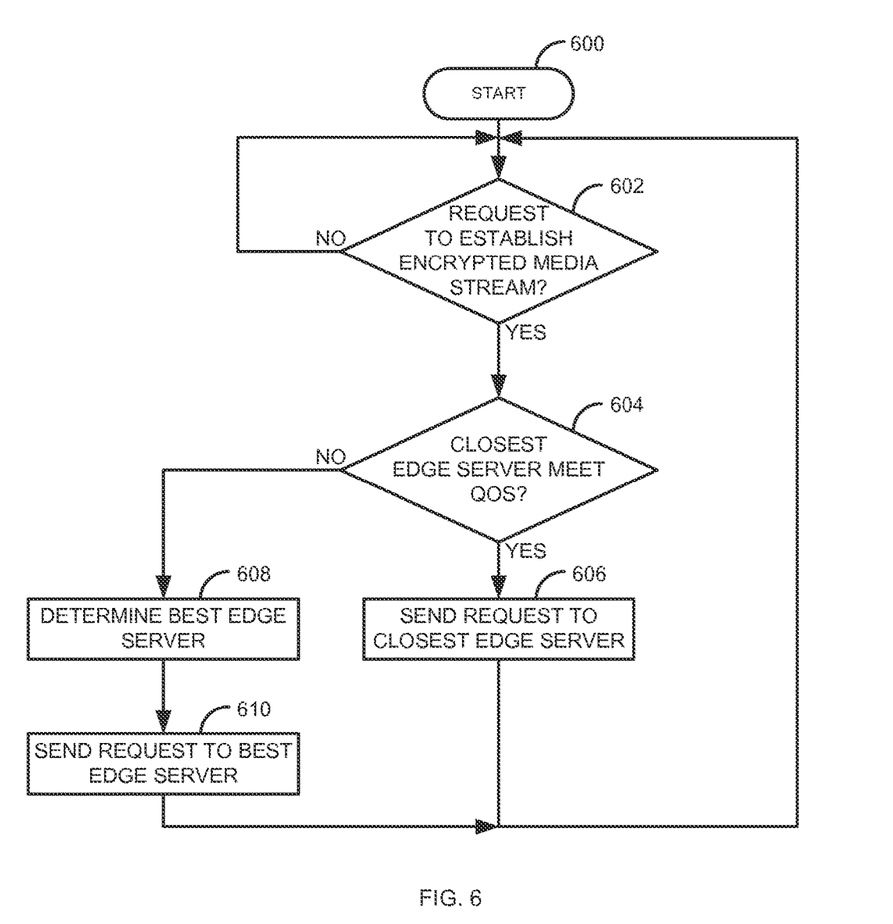
FIG. 6 is a flow diagram of a process for determining an edge server.

FIG. 5 is a flow diagram of a process for providing QoS for WebRTC communications. Illustratively, the browsers 101A-101N, the edge servers 120A-120N, the media relay 121, the policy enforcer 122, the WebRTC applications 123A-123N, the SDN controller 124, the routers 130A-130B, the gateway 250, the communication device 251, and the WebRTC media servers 360A-360N are stored-program-controlled entities, such as a computer or processor, which performs the methods of FIGS. 5-6 and the processes described herein by executing program instructions stored in a computer readable storage medium, such as a memory or disk. Although the methods described in FIGS. 5-6 are shown in a specific order, one of skill in the art would recognize that the steps in FIGS. 5-6 may be implemented in different orders and/or be implemented in a multi-threaded environment. Moreover, various steps may be omitted or added based on implementation.

The process starts in step 500. The edge server 120/320 determines in step 502 if a request to establish and encrypted WebRTC media stream has been received. If a request to establish an encrypted WebRTC media stream has not been received in step 502, the process repeats step 502.

Otherwise, if a request to establish an encrypted WebRTC media stream has been received in step 502, the QoS policy enforcer 122 retrieves the parameters/QoS parameters and/or the tenant identifier (if there is one) associated with the media stream in step 504. Retrieving the parameter(s)/QoS parameter(s)/tenant identifier can occur in different ways. For example, when a request to establish an encrypted WebRTC media stream is received, the edge server 120/320 may see the request. For example, the edge server 120/320 may include a reverse proxy server (not shown) that proxies the request to the WebRTC media application 123.

In another embodiment, the tenant identifier/parameter(s) of step 504 may be retrieved via an out-of-band communication with the WebRTC application 123. For example, the QoS policy enforcer 122 may retrieve the tenant identifier by sending a message to the WebRTC application 123. Alternatively, the WebRTC application 123 may automatically send the tenant identifier to the edge server 120 when the request to establish the encrypted media stream is received in step 502. The tenant identifier may be based on an IP address and/or port. The QoS policy enforcer 122 may receive the parameter(s)/tenant identifier via RTP or RTCP.

The QoS policy enforcer 122 determines if there is a tenant identifier associated with the media stream in step 506. If there is a tenant identifier associated with the media stream in step 506, the QoS policy enforcer 122 retrieves parameter/QoS parameter(s) associated with the tenant in step 508. For example, the QoS policy enforcer 122 may retrieve a list of parameters/QoS parameters that are associated with a Service Level Agreement (SLA) from a database. The parameters/QoS parameters in the SLA may define a particular codec, a jitter level, a packet priority, a routing path, and/or the like. A SLA may be different for each tenant. For instance, one tenant may have a higher priority for jitter and packet priority than another tenant. A tenant may be an individual person, a group of persons, an organization, a company, and/or the like. The process then goes to step 512.

Otherwise, if there is not a tenant identifier in step 506, the QoS policy enforcer 122 uses the retrieved parameters/QoS parameters received in step 504 (or a default list of parameters/QoS parameters). The QoS policy enforcer 122 sends a message, to the SDN controller 124 to configure the network 110B to support the one or more parameters/QoS parameters in step 512. The message of step 512 can be defined in various ways, such as defining a priority level based on a source/destination port and/or IP address. The message is used to access Application Programming Interfaces (APIs) exposed by the SDN controller 124 for controlling network elements (e.g., the routers 130B).

The SDN controller 124 controls QoS for network elements in the network 110B. For example, the SDN controller 124 can control the routers 130, the gateway 250, the communication device 251, the WebRTC media servers 360, network interface cards, and/or the like to support the one or more parameters/QoS parameters. The parameters/QoS parameters can control other network resources, such as a CPU(s) in a server, virtual machines, network interface cards, disk space, memory usage, and/or the like. The parameters/QoS parameters can be based on a specific tenant or SLA. For example, the SDN controller 124 can define (based on the message of step 512) a particular route (or routes) for packets in the media stream, a level of jitter for the media stream, a packet priority for the media stream, and/or the like. The SDN controller 124 can control the parameters/QoS parameters differently for different network elements based on different tenants.

After sending the message to the SDN controller 124, in step 512, the edge server 120 determines if the process is complete in step 514. If the process is complete in step 514, the process ends in step 516. Otherwise, the process goes back to step 502.

In one embodiment, the WebRTC application 123 can control the SDN controller 124 instead of the QoS policy enforcer 122. In this embodiment, the WebRTC application 123 sends the message to the SDN controller 124 to set the parameters/QoS parameters.

The process of FIG. 5 can be used for the system defined in FIG. 1 where there is only a single SDN 140. In this case, there would not be a tenant identifier.

The process of FIG. 5 can be used for the system defined in FIG. 2 where there are two or more Software Defined Networks (SDN) 140A-140N. For example, a user of the browser 101A can make a voice call to the browser 101B via the SDN 140A. Similarly the user of the browser 101C can make a video call to the browser 101N via the SDN 140N. In this example, each of the SDNs 140A-140N would use a different tenant identifier.

The process of FIG. 5 can also be used for the system defined in FIG. 3. In this example, a user of the VLAN 370A at one of the browsers 101A-101B can communicate via the VLAN 370A to the WebRTC media server 360A. Likewise, a user of the browsers 101C-101N can communicate via the VLAN 370N to the WebRTC media server 360N. The private cloud edge server 320 maintains a VLAN tag for each VLAN 370A-370N and an identifier for the SDNs 140A-140N to map between the two VLANs 370A-370N and the two SDNs 140A-140N. The QoS may be accomplished based on different tenants and their respective SLAs.

The process of FIG. 5 can also be used for the system defined in FIG. 4. For example, after the edge server 120A-120N has been selected based on a parameter/QoS parameter, the process of FIG. 5 can be implemented for communications to and from the respective SDNs 140A-140N.

In one embodiment, the edge server 120/320 can configure the parameters/QoS parameters based on a WebRTC call volume at the edge server 120/320. For example, if the first tenant has a higher priority than a second tenant, the edge server 120/320 can dynamically reduce the priority or bandwidth in one or more network resources for the second tenant based on a call volume at the edge server 120/320.

In another example, if the SDN 140A for tenant 1 is configured with 4 virtual CPUs, X bandwidth, Y network interface card and the SDN 140N for tenant 2 is configured with 2 virtual CPUs, Z bandwidth and K network interface card. If a SLA for tenant 2 states that tenant 2 has more preference than tenant 1 and volume/usage for tenant 2 increases (as seen by increase in traffic on corresponding vlan tag), the SDN controller 124 can dynamically allocate resources from tenant 1 to tenant 2.

FIG. 6 is a flow diagram of a process for determining an edge server 120/320. The process starts in step 600. The SDN controller 124, WebRTC application 123, and/or edge server 120/320 determines in step 602 if a request to establish an encrypted media stream is received in step 602. If a request to establish an encrypted media stream is not received in step 602, the process of step 602 repeats.

Otherwise, if a request to establish an encrypted media stream is received in step 602, the SDN controller 124, WebRTC application 123, and/or edge server 120/320 determines if the closest edge server 120/320 meets the QoS of the tenant in step 604. The SDN controller 124, WebRTC application 123, and/or edge server 120/320, each, or in combination can determine the closest edge server 120/320 to meet the QoS. For example, the edge servers 120A-120 may communicate their QoS information to each other. Alternatively, the SDN controller 124 or the WebRTC application 123 (where there is a single or master WebRTC application 123) may query/receive messages from the edge servers 120A-120N. If the closest edge server 120/320 meets the necessary QoS, the request is sent to the closest edge server 120/320 in step 606 and the process goes back to step 602.

Otherwise, if the closest edge server 120/320 does not meet the QoS of the tenant, the SDN controller 124, WebRTC application 123, and/or edge server 120/320 determines the best edge server 120/320 in step 608. The SDN controller 124, WebRTC application 123, and/or edge server 120/320 sends the request to the best edge server 120/320 in step 610 and the process goes to step 602. For example, the SDN controller 124 may determine that an edge server 120/320 in the United States is overloaded and redirect the request to the edge server 120/320 in Asia.

In one embodiment, the process may not identify the closest edge server 120/320. For example, step 604 may be to determine the best edge server 120/320 regardless of location.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH- EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

What is claimed is:

1. An edge server comprising:
a microprocessor,
a computer readable medium, coupled with the microprocessor;
a media relay executed by the microprocessor that receives a request to establish an encrypted media stream, for a Web Real-Time Communication (WebRTC) communication session between a first browser and a second browser or gateway, wherein the edge server is a boundary device between a first network and a second network; and
a policy enforcer executed by the microprocessor that retrieves, via the second network, a tenant identifier associated with the encrypted media stream and a list of one or more parameters associated with a tenant in response to receiving the request to establish the encrypted media stream for the WebRTC communication session, wherein the tenant identifier uniquely identifies an individual person, a group of persons, an organization, or a company; and dynamically sends a message, using the list of one or more parameters associated with the tenant, to configure one or more network elements in the second network to support the list of one or more parameters associated with the tenant for the WebRTC communication session between the between the first browser and the second browser.

2. The edge server of claim 1, wherein the second network comprises one or more routers, gateways, media servers, and/or communication devices and wherein the message dynamically configures the one or more routers, gateways, media servers, and/or communication devices in the second network to support the list of one or more parameters.

3. The edge server of claim 1, wherein dynamically configuring the second network is based on a Software Defined Network (SDN).

4. The edge server of claim 3, wherein the SDN supports a plurality of tenants, wherein the plurality of tenants are a plurality of organizations or companies, and wherein the edge server dynamically configures the second network differently based on individual ones of the plurality of tenants.

5. The edge server of claim 1, wherein the second network comprises a plurality of Software Defined Networks (SDNs) for a plurality of tenants on the second network and wherein the first network comprises one or more Virtual Local Area Networks (VLANs).

6. The edge server of claim 5, wherein the edge server maintains a mapping of a Virtual Local Area Network (VLAN) tag for the first network and a corresponding identifier for one of one of the plurality of SDNs for one of the plurality of tenants.

7. The edge server of claim 6, wherein the message instructs a SDN controller to provide a Quality of Service (QoS) according to a Service Level Agreement (SLA).

8. The edge server of claim 1, wherein the one or more parameters associated with the tenant dynamically controls one or more network resources according to a Service Level Agreement (SLA) for the tenant.

9. A method comprising:
receiving, at an edge server, a request to establish an encrypted media stream, for a Web Real-Time Communication (WebRTC) communication session, between a first browser and a second browser or gateway, wherein the edge server is a boundary device between a first network and a second network;
in response to receiving the request to establish the encrypted media stream, retrieving, by the edge server, via the second network, a tenant identifier associated with the encrypted media stream and a list of one or more parameters associated with the tenant, wherein the tenant identifier uniquely identifies an individual person, a group of persons, an organization, or a company; and
dynamically sending, by the edge server, using the list of one or more parameters associated with the tenant, a message to configure one or more network elements in the second network to support the list of one or more parameters associated with the tenant for the WebRTC communication session between the between the first browser and the second browser.

10. The method of claim 9, wherein the second network comprises one or more routers, gateways, media servers, and/or communication devices and wherein the message dynamically configures the one or more routers, gateways, media servers, and/or communication devices in the second network to support the list of one or more parameters.

11. The method of claim 9, wherein dynamically configuring the second network is based on a Software Defined Network (SDN).

12. The method of claim 11, wherein the SDN supports a plurality of tenants, wherein the plurality of tenants are a plurality of organizations or companies, and wherein the edge server dynamically configures the second network differently based on individual ones of the plurality of tenants.

13. The method of claim 12, wherein the second network comprises a plurality of Software Defined Networks (SDNs)

for a plurality of tenants on the second network and wherein the first network comprises one or more a Virtual Local Area Networks.

14. The method of claim 13, wherein the edge server maintains a mapping of a Virtual Local Area Network (VLAN) tag for the first network and a corresponding identifier to one of one of the plurality of SDNs for one of the plurality of tenants.

15. The method of claim 14, wherein the message instructs a SDN controller to provide a Quality of Service (QoS) according to a Service Level Agreement (SLA).

16. The method of claim 9, wherein a network resource for the tenant, that is external from the edge server, can be dynamically configured based on a WebRTC call volume at the edge server by the edge server.

17. A method comprising:
  receiving, by an edge server, a request to establish an encrypted media stream for a Web Real-Time Communication (WebRTC) communication session between a first browser, and a second browser or gateway, wherein the edge server is a boundary device between a first network and a second network;
  retrieving, by the edge server, via the second network, a parameter associated with the encrypted media stream, wherein the parameter for the encrypted stream is uniquely associated with a tenant and wherein the tenant is an individual person, a group of persons, an organization, or a company; and
  in response to receiving the parameter for the encrypted media stream for the WebRTC communication session, sending, by the edge server, a message using the parameter associated with the tenant to dynamically configure one or more network elements in the second network to support the parameter associated with the tenant for the WebRTC communication session between the first browser and the second browser.

18. The method of claim 17, wherein an SDN controller selects the edge server from a plurality of edge servers based on Quality of Service (QoS) information received from the plurality of edge servers.

19. The method of claim 18, wherein the message is sent to a WebRTC application or another edge server over an out-of-band link to configure the second network.

20. The method of claim 17, wherein the second network comprises one or more routers, gateways, media servers, and/or communication devices and wherein the message dynamically configures the one or more routers, gateways, media servers, and/or communication devices in the second network to support the parameter.

* * * * *